March 22, 1966 P. D. NORCROSS 3,241,393
HAND BRAKE ATTACHMENT
Filed Feb. 25, 1963

INVENTOR
PAUL D. NORCROSS
BY Williamson & Palmatier
ATTORNEYS

United States Patent Office 3,241,393
Patented Mar. 22, 1966

3,241,393
HAND BRAKE ATTACHMENT
Paul D. Norcross, 1311 W. Warner Ave., Chicago, Ill.
Filed Feb. 25, 1963, Ser. No. 260,571
4 Claims. (Cl. 74—501)

This invention relates to hand brake devices for automotive vehicles and more particularly to an attachment for use in conjunction with the conventional hand brake device to permit easy and economical replacement of the actuating cable which extends between the control handle and the actuating lever.

It has been found that the part of the conventional hand brake or emergency brake which is most likely to fail due to fatigue or wear, is the actuating cable which extends between the control handle and the actuating lever. Heretofore when this actuating cable failed it has been necessary not only to replace the cable but to replace the cable housing as well as the actuating lever to which one end of the cable is attached. Since the various parts of these hand brake replacement assemblies vary in structure with respect to the particular model of vehicle on which they are to be used, one particular assembly could only be used with a particular model of vehicle.

It is therefore a general object of this invention to provide an attachment device, of simple and inexpensive construction, attachable to the lower end of a conventional replacement hand brake actuating cable, when the original hand brake cable is replaced, and which obviates the necessity of replacing the cable housing and actuating lever.

Another object of this invention is to provide a hand brake attachment device for close combinative use with a replacement hand brake actuating cable for automotive vehicles, the attachment device being connectible to the lower end of the replacement actuating cable for cooperative engagement with the conventional actuating lever regardless of the particular construction of the latter, thereby obviating the necessity of not only replacing the actuating lever but also the cable housing.

A further object of this invention is to provide a hand brake attachment device of the class described including a socket member connectible to the lower end of the replacement hand brake actuating cable and including means for maintaining the socket member in engaging relation with the socket end portion of any conventional actuating lever whereby during the replacement of the hand brake cable, it is only necessary to trim the replacement cable to the proper length to accommodate the particular model automotive vehicle.

These and other objects and advantages of my invention will more fully appear from the following description made in connection with the accompanying drawings wherein like character references refer to the same or similar parts throughout the several views, and in which.

Figure 1:
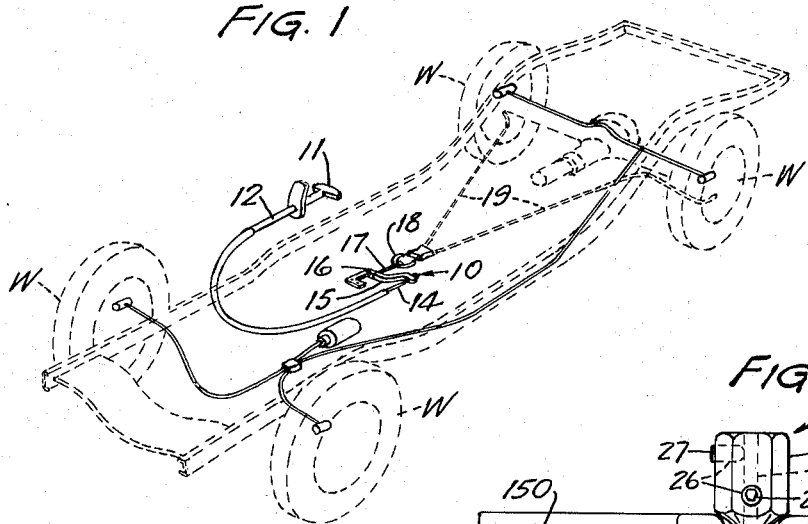
FIG. 1 is a diagrammatic perpective view of a conventional hand brake system incorporating my device and with the vehicle chassis illustrated in dotted line configuration.

Referring now to the drawings and more specifically to FIG. 1 it will be seen that one embodiment of my novel attachment device, designated generally by the reference numeral 10 is illustrated in the conventional hand brake system of an automotive vehicle. It will be noted that the conventional mechanical hand brake system includes an actuating handle 11 which is axially extensible and retractable into and out of a tubular housing 12, the latter being mounted interiorly of the conventional vehicle for ready access by the driver or operator thereof.

The housing 12 is constructed of suitable rigid material and has an elongate flexible actuator cable housing 13 secured to the forward end thereof. In most conventional vehicles as illustrated in FIG. 1, the flexible cable housing 13 extends forwardly and downwardly and has its lower end attached to the frame. This actuator cable housing 13 suitably houses the conventional hand brake actuator cable 14, the upper end of the actuator cable being connected to the actuating handle 11 by the conventional ball-slot connection in the conventional manner.

The lower end of the actuating cable member 14 is interconnected to the conventional actuating lever 15 and this actuating lever is pivotally connected as at 16 to the frame of a vehicle to permit fore and aft swinging of the lever about a substantially vertical axis. One end of the actuating lever 15 is connected by a connecting rod 17 to a U-shaped yoke member 18 so that the yoke member is caused to move during swinging movement of the lever.

The respective ends of the yoke member 18 are connected to the forward ends of the brake shoe actuating cables 19, the latter having their respective rearmost ends connected to the brake shoes for the rear wheels in the conventional manner. The operation of the hand brake system is well known in the art and it will be appreciated that when the actuating handle 11 is extended, the actuating cable 14 will be tensioned and will thereafter cause the actuating lever 15 to swing forwardly about its pivot 16. This actuating lever will cause tensioning of the brake shoe actuating cable 19 so that the brake shoes are shifted into engaging relation with their respective drums whereby a braking action will be produced with respect to the rear wheels W of the vehicle V.

As pointed out above in most conventional emergency or hand brake systems, that part thereof which is most subjected to wear and failure is the actuating cable. When the actuating cable breaks, it is necessary in the conventional systems to not only replace this cable but also to replace the cable housing and the actuating lever. Since the length of the actuating cable and actuating cable housing vary with respect to the different model vehicles and since the structure of the actuating lever will vary from one model vehicle to another, it becomes necessary for parts dealers and service stations to maintain a supply of the different model replacement kits for the various model automotive vehicles to which they are to be applied. My novel attachment device, serves to obviate the necessity of replacing the actuating cable housing as well as the actuating lever and requires only the replacement of the broken actuating cable.

Figure 2:
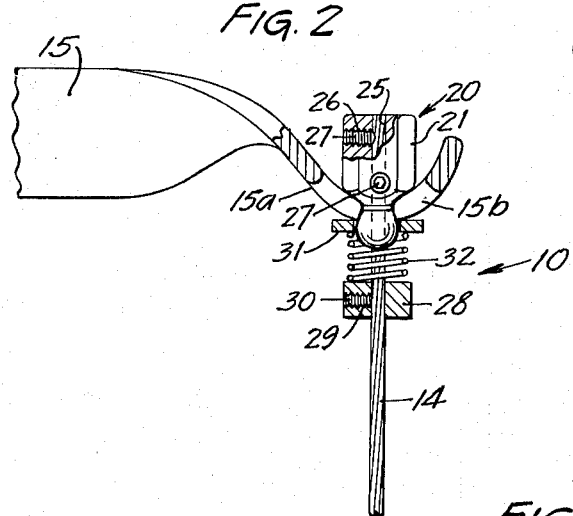
FIG. 2 is a top plan view of my invention on an enlarged scale shown attached to the lower end of an actuating cable and illustrated in cooperating relation with an actuating lever, with certain parts thereof broken away for clarity.
Figure 3:
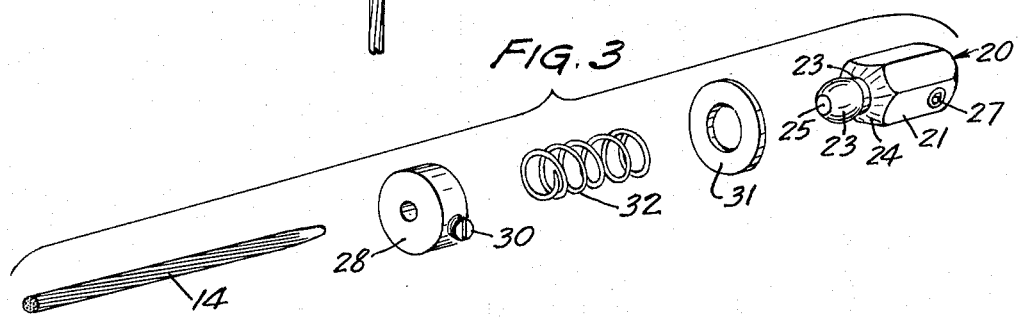
FIG. 3 is an exploded perspective view of my invention.

Referring now to FIGS. 2 and 3 it will be seen that my novel attachment device 10 includes a cable anchoring socket member 20 which includes an elongate body portion 21 of generally hexagonal cross sectional shape. This body portion 21 terminates at one end thereof in a reduced end portion 22 which is of smoothly arcuate ball shaped configuration. A small neck portion 23 interconnects the ball portion 22 with the body portion 21. It will be seen that a smoothly arcuate convex annular shoulder 24 is defined between the neck portion 23 and the body portion 21.

The socket member 20 has an axial bore 25 therethrough and this axial bore is adapted to receive the lower end of the actuating cable 14 therein. Means are also provided for releasably securing the cable anchoring socket member 20 to the lower end of the actuating cable and to this end it will be seen that the body portion 21 of the socket member is provided with a pair of threaded apertures 26 therein, each of which are disposed normal to and in communicating relation with the axial bore 25. These apertures 26 threadedly receive therein lock bolts or set screws 27, as best seen in FIG. 2, which engage and clamp the end of the cable 14 within the axial bore 25.

Referring now to FIG. 2 it will be seen that that end portion of the actuating lever 15 to which the cable 14 is interconnected is bent to define an arcuate socket portion 15a having a longitudinally extending slot 15b therein. It will be noted that when the cable anchoring socket member 20 is secured to the lower end of the cable 14, the reduced end portion 22 projects through the slot 15b in the actuating member and the annular convex shoulder 24 is disposed in engaging relation with the concave rear side of the socket portion 15a. It will be seen that the cable 14 is protected from bearing engagement with the edges of the socket portion 15a that define the slot 15b by the reduced ball-defining portion 22. The annular shoulder 24 permits smooth articulate movement between the cable anchoring socket 20 and the actuating lever 15 without the attendant danger of binding.

Means are also provided for maintaining the cable anchoring socket member 20 in engaging relation with the socket portion 15a of the actuating lever 15. This means includes an annular collar member 28 through which the lower end portion of the cable 14 projects as best seen in FIG. 2. This collar member 28 is provided with a radially extending threaded aperture 29 which communicates with the central opening therein and which threadedly receives a lock screw 30 therein for engaging the cable to clamp the collar in a predetermined fixed relation thereon. The lower end portion of the cable 14 also extends through another collar member 31 which is urged into bearing engagement with the convex side of the socket portion 15a of the actuating lever 15 by means of a coil spring 32. In the form of actuating level illustrated in FIG. 2, the reduced end portion 22 of the socket member 20 not only projects through the slot 15b of the actuating lever 15 but this reduced end portion also projects through the opening in the collar member 31. It will be seen that the coil spring 32 cooperates with the collar members 28 and 31 respectively to normally urge the annular shoulder 24 of the cable anchoring socket member into engaging relation with the concave side of the socket portion 15a of the actuating lever 15. The tension on the spring 32 may be readily varied by adjusting the collar 29 longitudinally with respect to the actuating cable 14.

When my novel attachment device is used in conjunction with a replacement actuating cable, the old cable is first disconnected from the actuating handle and the actuating lever. The new cable is then run through the old housing and threaded through the respective guide pulleys. The uppermost end of the replacement cable will have the conventional ball element affixed thereto and this ball element will be fastened to the actuating control handle 11 in the usual manner. The replacement cable will be of a length to accommodate any conventional cable housing regardless of the length and dimension of the latter. The collars 28 and 31 as well as the coil spring 32 will be positioned upon the cable and the cable then passed through the slot 15b in the actuating lever 15.

The cable anchoring socket member 20 will then be positioned upon the end of the cable and attached thereto when the desired tension is reached. The collar 28 will then be pre-set upon the cable 14 at a predetermined position to impart a desired amount of tension upon the socket member 20. Any excess amount of the cable projecting beyond the socket member 20 may then be trimmed therefrom as desired and any further minor adjustments may then be made. The annular shoulder plus the smoothly arcuate convex construction of the reduced end portion of the socket member permits smooth articulate coaction between the socket portion of the actuating lever 15 and the socket member 20 of my novel attachment. The particular shape, construction and configuration of the socket member 20 as well as the socket member tensioning means accommodates substantially all actuating levers and is attachable to the actuating cables normally employed in emergency hand brake systems. Thus the need of replacing the actuating lever and the cable housing is obviated.

Figure 4:
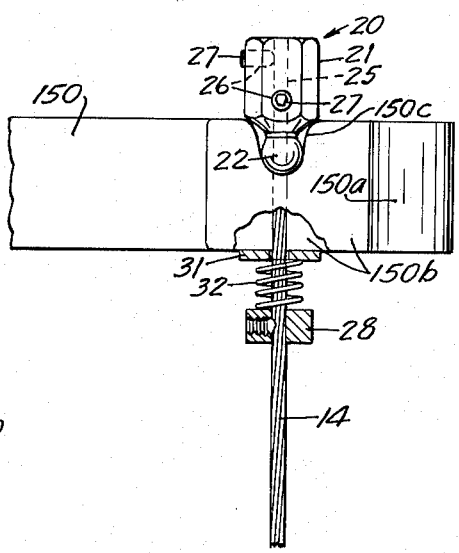
FIG. 4 is a top plan view similar to FIG. 3 illustrating my invention in cooperating relation with a different model actuating lever.

Referring now to FIG. 4 it will be seen that a different form actuating lever 150 is illustrated and which has one portion bent upon itself as at 158 to define upper and lower straps 150b. These straps 150b are vertically spaced from each other and are recessed as at 150c so that a socket portion of the actuating lever 150 is defined. It will be noted that the forward end of the reduced ball end portion 22 engages the innermost portion of the socket defined by the recess 150c and that the annular shoulder 24 engages the rearmost portion of the socket defined by the recesses in the straps. The collar 31 is urged against the forward substantially planar portion of the straps and cooperates with the collar 28 and spring 32 to urge the socket member 20 into engaging relation with respect to the socket defining portion of the actuating lever 150. Thus the smoothly arcuate configuration of the ball end portion 22 as well as the smoothly arcuate configuration of the annular shoulder 24 cooperate with the socket defining recessed straps to permit smooth articulate coaction between the socket member and the actuating lever 150. The ball end portion of the socket member 20 also serves to prevent the cable from binding against the actuating lever in a manner to cause wear of the cable. It is also pointed out that in some model vehicles, a small dome-shaped adaptor may be used in conjunction with the reduced ball end portion of the socket member to accommodate the particular configuration and size of the slotted socket portion of the actuating lever. However, in substantially all model vehicles it is only necessary to use the socket member since this socket member will accommodate substantially most of the actuating lever socket portions.

It will therefore be seen from the foregoing description that I have provided a novel attachment device for use in combination with a replacement hand brake cable and which obviates the necessity of replacing the cable housing and the actuating lever.

It will also be seen from the foregoing description that through the use of my novel attachment device, a substantial saving in parts is accomplished. Because of the extreme simplicity of my attachment device, as well as the diminutive size of the parts thereof, the device may be economically produced and inexpensively packaged.

Thus it will be seen from the preceding description that I have provided a novel and improved attachment device for use in facilitating replacement of the hand brake actuating cable and which is not only of simple and inexpensive construction but which functions in a more efficient manner than any heretofore known comparable device.

It will of course be understood that various changes may be made in the form, details, arrangement and proportions of the various parts without departing from the scope of my invention.

What is claimed is:

1. A hand brake cable attachment device for use in conjunction with a hand brake actuating cable of the type having its upper end connected to the control handle and having its lower end connected to a slotted arcuate lever,
said device including a cable anchoring socket member including a body portion having a smoothly arcuate annular convex shoulder adjacent one end thereof, and terminating at said one end in a convex smoothly arcuate ball portion of reduced cross sectional configuration, said annular shoulder being engageable with the rear concave surface of the slotted socket of a hand brake actuating lever,
said socket member having an axial bore therethrough receiving the lower end of the actuating cable therein,
means releasably securing said socket member to the lower end of the actuating cable,
and resilient means engageable with the front surface of the actuating lever and the actuating cable for maintaining the annular shoulder of said socket member in engaging relation with the slotted socket.

2. The attachment device as defined in claim 1 wherein said resilient means includes an annular collar connectible to the actuating cable in spaced relation from the actuating lever, and a coil spring interposed between said collar and the actuating lever.

3. The device as defined in claim 1 wherein said ball portion of said socket member projects through the slotted socket in the hand brake actuating lever.

4. The device as defined in claim 1 wherein said ball portion of said socket member is also engageable with the concave surface of the slotted socket member of the hand brake lever.

References Cited by the Examiner

UNITED STATES PATENTS

| | | | |
|---|---|---|---|
| 807,100 | 12/1905 | Wood | 287—21 |
| 2,288,767 | 7/1942 | Young | 287—21 X |
| 2,311,043 | 2/1943 | Furey | 287—82 X |
| 2,629,286 | 2/1953 | Budreck | 287—21 X |
| 2,751,793 | 6/1956 | Sandberg | 74—502 |

FOREIGN PATENTS 1,210,786  10/1959  France.

BROUGHTON G. DURHAM, *Primary Examiner.*

MILTON KAUFMAN, *Examiner.*